United States Patent [19]

Fukushima

[11] 4,402,224

[45] Sep. 6, 1983

[54] PRESSURE RESPONSIVE MONITORING DEVICE FOR VACUUM CIRCUIT INTERRUPTERS

[75] Inventor: Tomio Fukushima, Higashimine, Japan

[73] Assignee: Kabushiki Kaisha Meidensha, Tokyo, Japan

[21] Appl. No.: 246,617

[22] Filed: Mar. 23, 1981

[30] Foreign Application Priority Data

Mar. 24, 1980 [JP] Japan ............ 55-37098
May 22, 1980 [JP] Japan ............ 55-68312

[51] Int. Cl.$^{3}$ ............ G01L 9/00

[52] U.S. Cl. ............ 73/705; 73/49.3; 73/52; 340/605; 340/626

[58] Field of Search ............ 73/49.2, 49.3, 52, 753, 73/705; 340/605, 626

[56] References Cited

U.S. PATENT DOCUMENTS 3,594,754 7/1974 Voshall ............ 340/605
4,103,291 9/1978 Howe et al. ............ 340/522
4,163,130 7/1979 Kubota et al. ............ 200/144 B

*Primary Examiner*—Donald O. Woodiel
*Attorney, Agent, or Firm*—Lowe, King, Price & Becker

[57] ABSTRACT

The invention discloses a monitoring device for monitoring vacuum pressure of an electrical device employing an evacuated envelope. The invention provide, particularly, a pressure responsive monitoring device which comprises an electric field generating device of vacuum type, an electric field detector means including a light source for generating light, an electric field detector detecting change of the electric field of the electric field generator due to the change of vacuum pressure inside the envelope and controlling the light depending upon the change of the electric field, and photoelectric converter for converting the light controlled by the electric field detector to an electric signal which is employed to monitor the vacuum pressure of the envelope.

27 Claims, 19 Drawing Figures

PRESSURE RESPONSIVE MONITORING DEVICE FOR VACUUM CIRCUIT INTERRUPTERS

FIELD OF THE INVENTION

The present invention relates to a pressure responsive monitoring device for vacuum circuit interrupter, and more particularly to a monitoring device for measuring vacuum pressure in a vacuum circuit interrupter.

BACKGROUND OF THE INVENTION

The vacuum pressure of an electric vacuum interrupter should be monitored in order to maintain the desirable operating characteristic thereof. The superior characteristics of vacuum as a dielectric make its use in power interrupting devices preferable over the use of special arc extinguishing materials, such as gases and liquids. Since vacuum offers both a high dielectric strength and a high recovery rate of voltage per microsecond, interruption can normally be anticipated at the first current zero in an A.C. current waveform. Furthermore, a small gap between contacts can perform the interruption of current. The short gap permits the use of a short contact displacement stroke, enabling the use of a device of low mass and inertia which results in high operating speed and low mechanical shock.

Normally, the operating sequence of the vacuum circuit interrupter from a fault to clear may be accomplished in less than three cycles. Since energy dissipated during a fault is proportional to time, the faster clearing action of a vacuum interrupter means less damage, lower contact erosion, longer maintenance-free contact life, and maximum equipment protection. An important problem in vacuum type electrical devices is that the characteristics of the devices are influenced by the strength of vacuum pressure. Namely, the problem with the use of vacuum circuit interrupters is that if there is a loss of vacuum, as by leakage of air through a crack caused by undue mechanical stresses, both the high strength of the vacuum dielectric and the rapid recovery are lost. The small contact spacing will no longer be able to sustain the high voltages. Arcs and flashovers will occur. The white hot arc will burn the electrode and melt the envelope, and may even extend into and attack other parts of the interrupter assembly.

In power systems it is important to know whether a leak has occurred while the contacts are open or closed during operation of the circuit with which the interrupter is associated. If the leak occurs when the contacts are closed in a grounded three phase system, it is dangerous to interrupt the power systems. Accordingly the power must be turned off upstream of the current interrupter in order to be able to remove and replace the interrupter. If this is not done, an arc will be drawn and the equipment damaged when the interrupter contacts are opened. In recent years various types of pressure measuring systems for vacuum circuit interrupters have been put into practical use. These pressure measuring systems, however, have disadvantages in the practical use.

OBJECTS OF THE INVENTION

It is an object of the present invention to provide an improved pressure responsive monitoring device for vacuum circuit interrupters.

It is another object of the present invention to provide a pressure responsive monitoring device for vacuum circuit interrupters which is highly reliable and results in high performance.

It is an object of the present invention to provide a high performance pressure responsive monitoring device which can continuously monitor the vacuum pressure of a vacuum circuit interrupter by employing a photoelectric converter.

In order to accomplish these objects, the present invention provides a pressure responsive monitoring device for vacuum circuit interrupters comprising, substantially, a vacuum circuit interrupter to be monitored and generating an electric field, an electric field detecting member for detecting the change of electric field of said vacuum circuit interrupter corresponding to changes of vacuum pressure of the vacuum circuit interrupter, and a photoelectric converting member for controlling the quantity of light to be passed therethrough. The electric field detecting member comprises a light polarizing element and an electric field detecting element for changing the direction of polarization of the light in accordance with the electric field applied thereto.

BRIEF DESCRIPTION OF THE DRAWINGS

Additional objects and advantages will become apparent upon consideration of the following description when taken in conjunction with the accompanying drawings. In the drawings like parts in each of the several figures are identified by the same reference characters, and:

FIG. 8 is other embodiment of a pressure responsive monitoring device for the vacuum circuit interrupters in accordance with the present invention.

DETAILED DESCRIPTION OF THE PREFERRED EMBODIMENTS OF THE INVENTION

Figure 1:
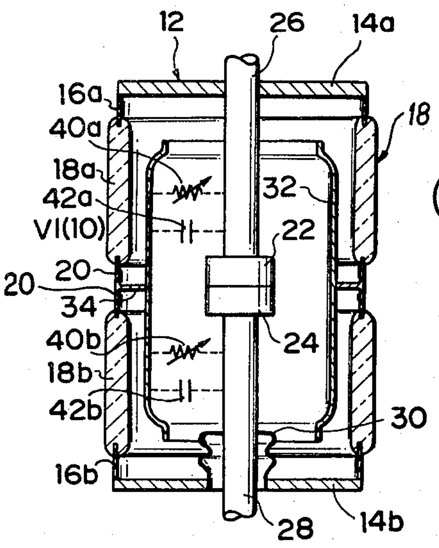
FIG. 1 is a sectional view of a vacuum circuit interrupter to be monitored by means of the present invention.

Referring to FIG. 1 of the drawings, there is shown an electric device of vacuum type in the form of a vacuum interrupting unit VI (10). The vacuum interrupting unit VI (10) comprises a highly evacuated envelope 12. This envelope 12 comprises a tubular insulating housing 18 and a pair of metallic end plates 14*a* and 14*b* located at opposite ends of the insulating housing 18. The end plates 14*a* and 14*b* are joined to the insulating housing 18 by vacuum tight seals in the form of metallic tubes 16*a* and 16*b*.

The insulating housing 18 comprises two short tubular insulating sections 18*a* and 18*b* made of suitable glass or ceramics. Two metallic tubes 20, 16*a* (16*b*) are connected hermetically in the tubular section 18*a* (18*b*). It should be noted that the number of sections is not restricted to two, and that other embodiments of the present invention may have a different number. The tubular insulating sections are disposed colinearly and are joined together by a metallic disc 34 and two tubes 20,20 providing hermetic seals between the insulating sections.

Disposed within the envelope 10 are two contacts relatively movable with respect to each other, shown in their fully contacted position. An upper contact 22 is a stationary contact, and a lower contact 24 is a movable contact. The stationary contact is suitably brazed to the lower end of a conductive supporting rod 26, which is integrally jointed at its upper end to the metallic end plate 14*a*. The movable contact 24 is suitably brazed to the upper end of a conductive operating rod 28, which is vertically movable to effect opening and closing of the interrupter.

For permitting vertical motion of the operating rod 28 without impairing the vacuum inside the envelope 12, a suitable bellows 30 is provided around the operating rod 28. A tubular main shield 32 surrounds the contacts 22,24 and protects the inner surface of the insulating sections 18*a*, 18*b* from being bombarded by arcing products.

The interrupter can be operated by driving the movable contact 24 upward and downward to close and open the power line. When the contacts are engaged, current can flow between opposite ends of the interrupter via a path comprising the operating rod 28, the movable contact 24, the stationary supporting rod 22 and the stationary contact 26.

Circuit interruption is effected by driving the contact 24 downward from the closed contacts position by suitable operating means (not shown in the drawings). This downward motion establishes an arc between the contacts. Assuming an alternating current circuit, the arc persists until about the time a natural current zero is reached, at which time the arc extinguishes and is thereafter prevented from reigniting by the high dielectric strength of the vacuum. A typical arc is formed during the circuit interrupting operation. For protecting the insulating housing 18 from the metallic vapors, the main shield 32 is supported on the tubular insulating housing by means of annular metallic disc 34. This disc 34 is hermetically joined at its outer periphery to the central metallic tubes 20, 20 and at its inner periphery to the shield 32. The shield is in turn coupled to the contacts 22 and 24 by leakage resistance 40*a* and 40*b* and by stray capacitance 42*a* and 42*b*.

Figure 2A:
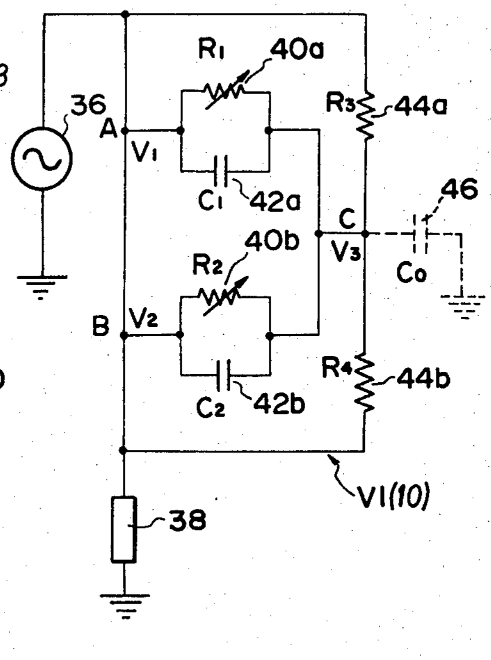
FIG. 2A is an equivalent circuit diagram of the vacuum circuit interrupter of FIG. 1 when its contacts are in a closed position.

The vacuum circuit interrupter shown in FIG. 1 is represented schematically by a diagram shown in FIG. 2. In the diagram of FIG. 2, a power supply 36 is interrupted or opened by the vacuum interrupting unit VI (10). A variable resistor 40*a* shows leakage resistance between the stationary contact 22 (including the supporting rod 26) and the main shield 32. The capacitor 42*a* illustrates stray capacitance between the stationary contact 22 (including the supporting rod 26) and the shield 32. The variable resistor 40*b* represents leakage resistance existing between the movable contact 24 (including the operating rod 28) and the shield 32, and the capacitor 42*b* also represents to stray capacitance between the movable contact 24 (including the operating rod 28) and the shield 32. Insulating sections 18*a* and 18*b* are, rspectively, represented by the resistor 44*a* and the resistor 44*b*. The interrupter VI is generally connected between the power supply 36 and a load 38 in order to interrupt a load current supplied from the power supply 36 to the load 38. Stray capacitance between the main shield 32 jointed to the metallic tubes 20, 20 and the ground is schematically shown as a capacitor 46.

Assuming that the potential difference between the stationary contact 22 and the main shield 32 is $V_1$, and the potential at the movable contact 24 and the main shield 32 is $V_2$, the potential difference $V_3$ between the shield 32 and ground is determined by the voltages at points A and B and the voltage differences $V_1$ or $V_2$ between points A or B and point C. Namely, the voltage drop between the point A or B and the point C depends upon a resultant reactance component of the variable resistors 40*a* and 40*b* and capacitors 42*a* and 42*b* and a current component which flows between the point A or B and the point C by way of the variable resistors 40*a* and 40*b* and the capacitors 42*a* and 42*b*. It will be appreciated that the resultant reactance component depends upon the pressure of vacuum of the envelope 12 shown in FIG. 1. In this case, capacitance values of the capacitors 42*a* and 42*b* are constant in spite of changes in the vacuum pressure. Resistance values of the variable resistors 40*a* and 40*b* are, on the other hand, varied in accordance with the vacuum pressure inside envelope 12. Under normal operating condition the potential at the point C is maintained constant. When the pressure of vacuum due to leakage or generation of metallic vapor is increased, ions are formed in the envelope 12. By the formation of ions, leakage current flows between the contacts 22, 24 and the shield 32 because of the change in leakage resistance. Accordingly, by the loss of vacuum the leakage current flows from the contacts 22 and 24 to ground by way of the variable resistors 40*a*, 40*b*, and the stray capacitance 46. By this flow of the leakage current, the potential difference $V_3$ changes in accordance with the pressure of vacuum inside envelope 12. On the other hand, capacitance values $C_1$ and $C_2$ are approximately constant in spite of the change in vacuum pressure, because specific inductive capacity is almost equal in all pressure of vacuum of the envelope 12.

It will be obvious that the potential difference $V_2$ of the movable contact 24 is equal to the potential difference $V_1$ of the stationary contact 22, when the contacts are in the closed position. Accordingly, the potential difference $V_3$ of the metallic shield connected to the metallic tubes 20, 20 is changed in accordance with the leakage resistance values between contact 22 or 24 and the shield 32. Moreover, the potential difference $V_3$ at the tubes 20, 20 is affected by the capacitance value of the stray capacitance 46 between the main shield 32 and the ground.

Figure 3:
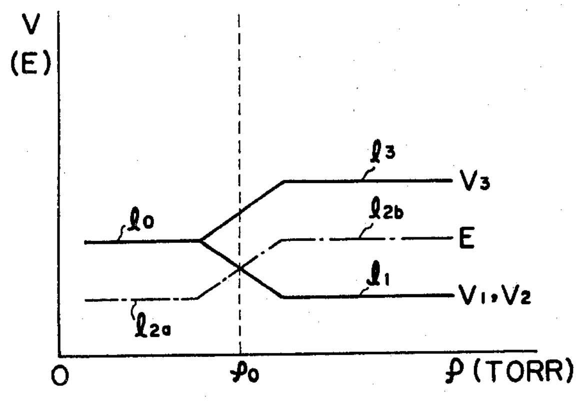
FIG. 3 is a characteristic diagram showing the relationship between the pressure of vacuum of a vacuum circuit interrupter and an electric field and potential appearing at the interrupter.

The interior of the envelope 12 is usually maintained highly evacuated, at pressures of $10^{-7}$ Torr to $10^{-4}$ Torr. When the vacuum interrupter has the proper vacuum pressure, the potential at main shield 32 is maintained constant, as is shown by the experimental data of FIG. 3. In the data shown in FIG. 3, a curve $l_o$ shows the potential differences $V_1$, $V_2$ and $V_3$ when the vacuum interrupter has the proper vacuum. A curve $l_1$ shows the potential differences $V_1$ and $V_2$ when the pressure of vacuum is increased. Further, the curves $l_{2a}$ and $l_{2b}$ are illustrative of field strength at a position spaced apart from the vacuum circuit interrupter in the vicinity of the tubular main shield 32.

Figure 2B:
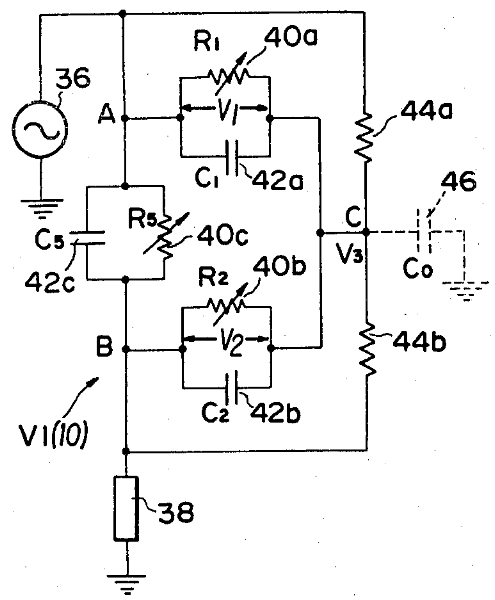
FIG. 2B is an equivalent circuit diagram of the vacuum circuit interrupter when its contacts are in a opened position.

FIG. 2B shows a schematic diagram of the vacuum interrupting unit VI (10) when the contacts 22 and 24 are in a opened position. In FIG. 2B, a variable resistor 40C represents leakage resistance between the stationary contact 22 and the movable contact 24, and a capacitor **42*c* also represents stray capacitance between the stationary contact 22 and the movable contact 24. The leakage resistance between contacts also varies in accordance with the vacuum pressure of the envelope 12. Accordingly, it will be apparent that the potential difference $V_3$ at the tubular main shield 32 varies responsively to the pressure of vacuum within the envelope 12 as in FIG. 2A, because the potential difference of each portion of the interrupter changes in accordance with the leakage current inside the envelope 12**.

Figure 4:
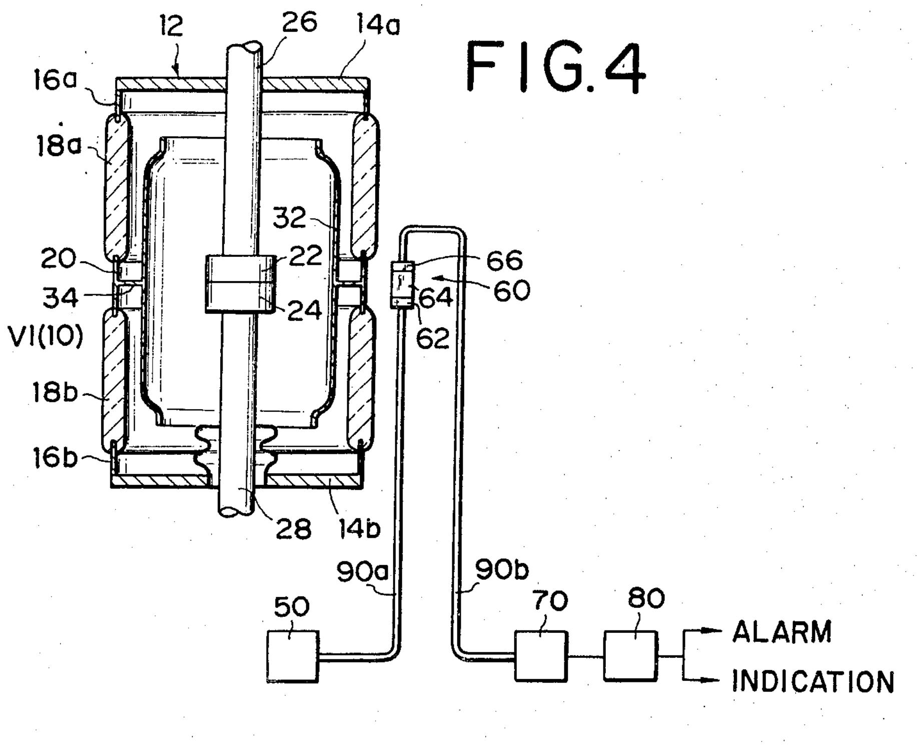
FIG. 4 is a sectional view of an embodiment of a pressure responsive monitoring device for vacuum circuit interrupters in accordance with the present invention.

Referring now particularly to FIG. 4, the pressure responsive monitoring device for vacuum circuit interrupter is shown in greater detail. The monitoring device comprises an electric field generating member in the form of a vacuum circuit interrupter to be tested, a light source 50 for generating light, an electric field detecting member 60 for detecting electric field and for converting variation of the electric field to optical variation responsive to the electric field strength, a photoelectric converting member 70 for converting optical energy, supplied by the electric field detecting member to electrical energy, and a vacuum pressure change discriminating circuit 80 responsive to the output of converter 70 for discriminating the vacuum pressure change and outputting an electric signal.

In more detail, the light source is provided with a light emitting diode generating light in accordance with current flowing thereto. The electric field detecting member 60 is disposed on and/or in the vicinity of the vacuum circuit interrupter having the main shield 32. The electric field detecting member 60 is interconnected with the light source 50 by a light guide tube in the form of an optical fiber **90*a*. The electric field detecting member 60 comprises a polarizer 62, an electric field sensitive element in the form of a Pockels cell 64 and an analyzer 66. The Pockels cell 64 is arranged between polarizer 62 and the analyzer 66. The analyzer 66 is connected to the photo-electric converting member 70 by a light guiding tube in the form of an optical fiber 90*b*. The vacuum pressure change discriminating member 80 is electrically connected to the photo-electric converting member 70**, and an electrical output signal is employed as an alarm signal, an indicating signal and the like.

Figure 5:
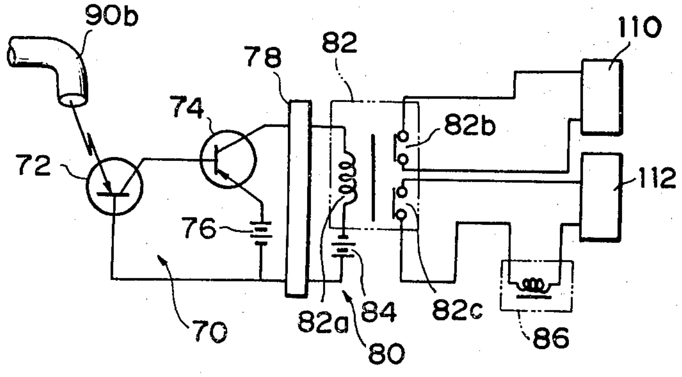
FIG. 5 is a detailed circuit diagram showing a part of the device of FIG. 4.

FIG. 5 shows a detailed circuit of the photo-electric member 70 and the vacuum pressure change discriminating member 80. As is shown in FIG. 5, the photo-electric member 70 comprises a phototransistor 72, a transistor 74, a battery 76, and an amplifier circuit 78, and is connected as shown. Further, the vacuum pressure change strength discriminating member 80 comprises a relay 82, and a battery 84, and is also connected as shown. The relay 82 has an energizing coil **82*a* and contacts 82*b* and 82*c*. The output of relay 82 is supplied to an alarm circuit 110 and to an indicating circuit 112**.

The operation of the pressure responsive monitoring device will be described by means of FIG. 6 as follows.

Figure 6:
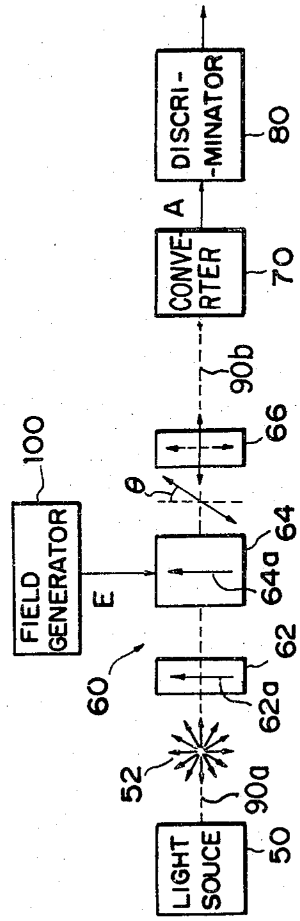

As is shown in FIG. 6, the light produced by the light source 50 is a random polarized light 52. The random polarized light 52 is supplied to the electric field detecting member 60 by way of the optical fiber **90*a*. In the electric field detecting member 60, the randum light 52 is polarized by the polarizer 62 to produce a linearly polarized light. The directional polarization of the linearly polarized light is shown by an arrow 62*a*. The linearly polarized light 62*a* is applied to the Pockels cell 64. An electric signal in the form of electric field E is applied to the Pockels cell 64 by the electric signal generating member 100 in the form of the vacuum circuit interrupter VI. The Pockels cell 64 causes the direction of polarization to change. The analyzer 66 is provided such that its plane of polarization is perpendicular with respect to the optical axis. The electric field strength to be applied to the Pockels cell 64 is determined by the change of vacuum pressure of the interrupter. The light provided by the Pockels cell 64 is dependent upon the applied electric field E and is supplied the analyzer 66**.

Figure 7:
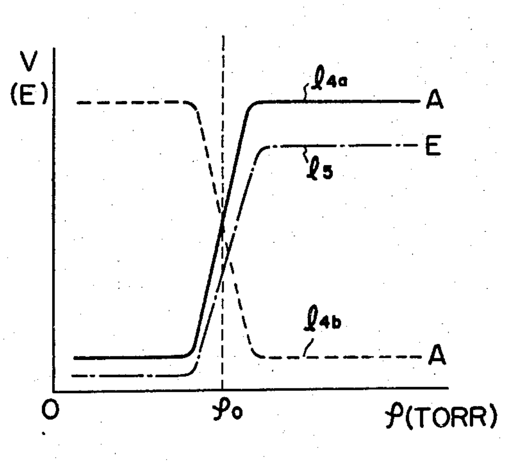
FIG. 7 is a characteristic diagram showing the relationship between the pressure of vacuum and output signals in the device of FIG. 4.

When the vacuum pressure is proper, the electric field E is low, as is shown by a curve $l_{4a}$ of FIG. 7 and, on the other hand, the electric field E becomes high when the pressure of vacuum increases. A phase angle $\theta$, representing the change in direction of a plane of polarization provided by cell 64, changes in accordance with the change in applied field intensity which corresponds to the change of vacuum pressure of the vacuum interrupting unit VI. The angle $\theta$ is set so as to be zero when the pressure of vacuum is proper, and becomes large when the vacuum is lost. Consequently, the quantity of light passed to converter 70 is high in case of the loss of vacuum and, therefore, output signal A of the converting member 70 increases, as is shown by a curve $l_{4a}$ of FIG. 7. Additionally, a curve $l_{4b}$ shown in FIG. 7 is a characteristic of the output of the converting member 70 when the analyzer 66 is provided such that its plane of polarization assumes a parallel relationship with respect to that of the polarizer 62.

The vacuum strength discriminating member 80 activates in accordance with the output signal A of the photo-electric converting member 70 to annunciate the loss of vacuum. As is shown in FIG. 5, the phototransistor 72 of the photo-electric converting member 70 receives the light from the analyzer 66 of the field detecting member 60, and thence becomes conductive. When the phototransistor 72 turns ON, the transistor 74 is biased to be conductive. By the conduction of the transistor 74, electric power is supplied from battery 76 to the amplifier circuit 78. The amplified power from the amplifier circuit 78 is supplied to coil 82*a* of the relay 82 to operate the contacts 82*b* and 82*c*. By the operation of contacts 82*b* and 82*c*, the alarm circuit 110 and the indicating circuit 112 is activated to indicate the loss of vacuum of the vacuum circuit interrupter.

Although the loss of vacuum is detected by means of sensing the variation of the potential difference in the vicinity of the tubular main shield in the monitoring device described above, it is possible to detect the loss of vacuum, by sensing the variation of the electric field in other portions of the envelope of the vacuum circuit interrupter. Moreover, it is appreciated that other electrical devices of the type to be monitored can be used.

According to the monitoring device of the above embodiment, the pressure of vacuum can be monitored in noncontacting condition without changing the structure of the vacuum circuit interrupter. Since insulation between the high voltage portion of the vaccum circuit interrupter and the electric field detecting member can be easily provided, monitoring of the pressure of vacuum can be performed in all voltage ranges of the interrupter.

Since, in accordance with the invention, a high voltage device in the form of the interrupting unit VI, is isolated from a low voltage device such as a measuring circuit, by a light coupler, monitoring operation of the high voltage device is simplified. Since the electric field detecting member 60 is constructed of an insulating material such as an analyzer, a Pockel's cell and a polarizer and the like, high reliability is obtained. Detection of the pressure of vacuum is performed by an optical device, and thereby a high performance monitoring device can be obtained because the device is free from electrical noise.

Moreover, according to the embodiment described above, the vacuum pressure detector element is located adjacent to the electric field generating portion of the vacuum circuit interrupter, the change of the pressure of vacuum inside the envelope 10 being detected by means of the optical device. With this arrangement the change of the electric field due to the change of vacuum pressure can be applied to the electric field detecting member 60. Therefore, the electric field detecting member 60 converts the electric field strength to a quantity of light energy. The quantity of light energy is converted to electric energy by means of the photo-electric converting means.

Figure 8:
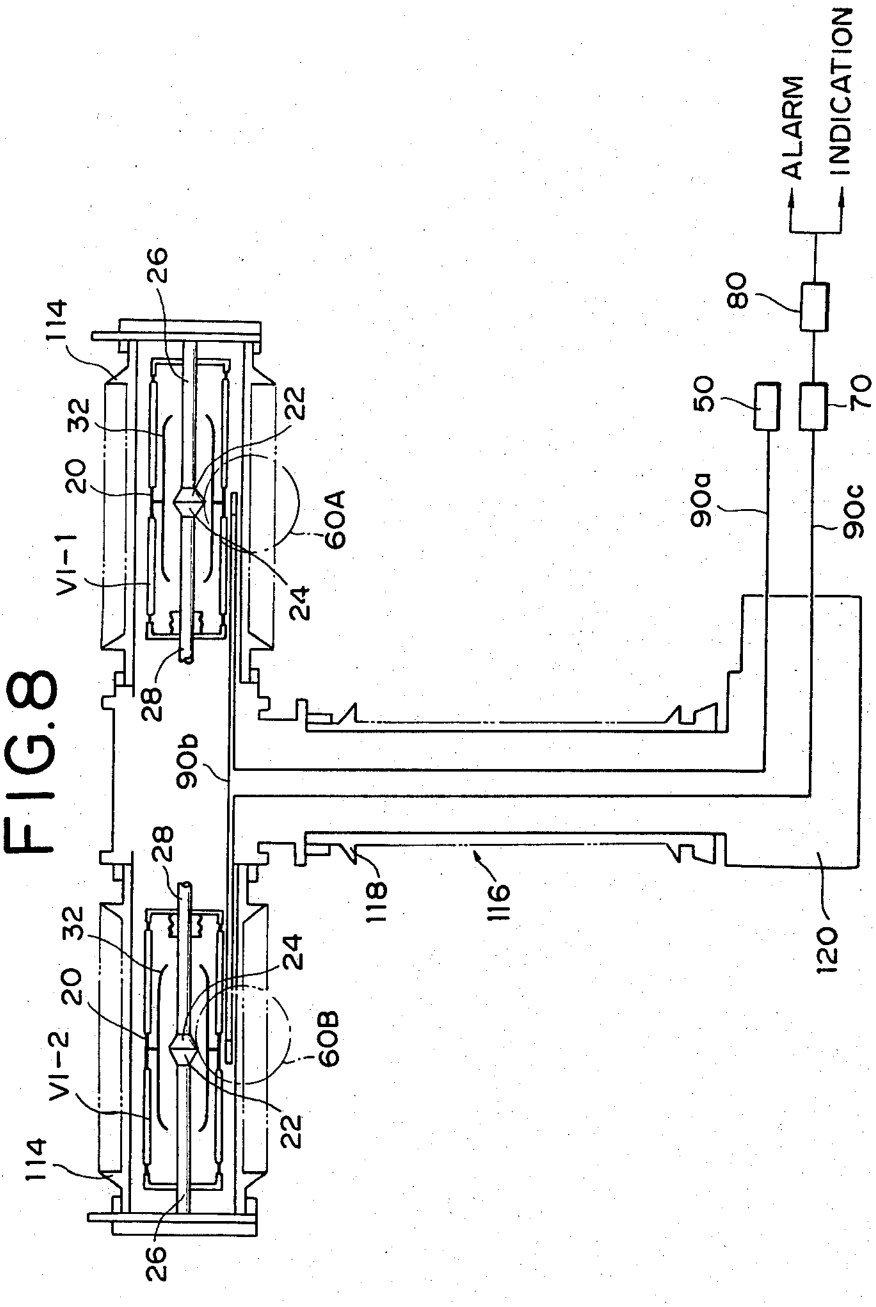
FIG. 8 is a block diagram showing the pressure responsive monitoring device of FIG. 4.

FIG. 8 is illustrative of one possible embodiment of a pressure responsive monitoring device for a vacuum circuit interrupter in accordance with the present invention. In the device shown in FIG. 8, a plurality of vacuum interrupting units can be monitored by means of only one detecting circuit loop. Particularly, an electric field generating member 100 is provided with series connected vacuum interrupting units VI-1 and VI-2 in one phase of a power line. The vacuum interrupting unit VI-1 is electrically and mechanically connected to the vacuum interrupting unit VI-2.

Each of the vacuum interrupting units VI-1 and VI-2 is respectively enclosed in an insulating material in the form of a porcelain tube 114.

As is best shown in FIG. 8, the vacuum circuit interrupting apparatus comprises the first interrupting unit VI-1 to be monitored, the second interrupting unit VI-2 to be monitored and connected to the first interrupting unit VI-1 in series relationship, a supporting member 116 including a porcelain tube 118, and an operating unit 120 for operating the units VI-1 and VI-2. A first electric field detecting member 60A is provided in the vicinity of a tubular main shield 32 of an envelope 10 of the first interrupting unit VI-1, and a second electric field detecting member 60B is located in the vicinity of a tubular main shield 32 of an envelope 10 of the second interrupting unit VI-2. An electric field detecting circuit loop comprises a light source 50, the first electric field detecting member 60A connected to the light source 50 by way of an optical fiber 90*a*, the second electric field detecting member 60B connected to the first electric field detecting member 60A by an optical fiber 90*b*, a photo-electric converting member 70 connected to the second electric field detecting member 60B, by an optical fiber 90C, and a vacuum pressure change discriminating member 80.

Figure 9:
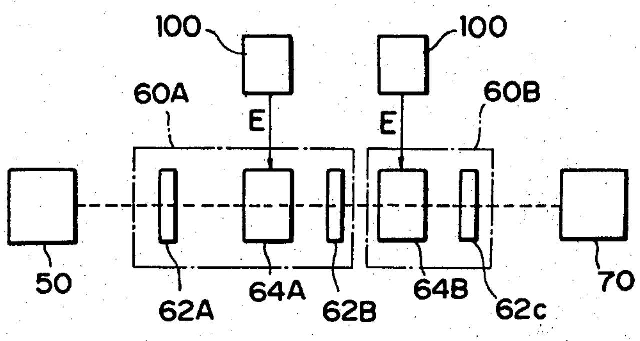
FIG. 9 is a block diagram of the monitoring device of FIG. 8.
Figure 10A:
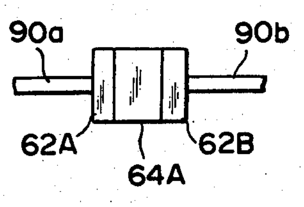
FIG. 10A is a plan view of an electric field detecting member used in the present invention.
Figure 10B:
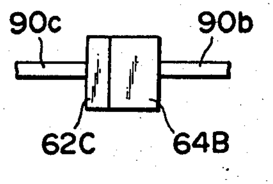
FIG. 10B is a plan view of another electric field detecting member used in the present invention.

As is shown respecting in FIGS. 9, 10A, 10B, the first electric field detecting member 60A is equipped with a first polarizer 62A and a second polarizer 62B and a first electric field sensing element in the form of a first Pockels cell 64A. On the other hand, the second electric field detecting member 60B is equipped with a second electric field sensing element, in the form of a second Pockels cell 64B provided to the optical input side, and a third polarizer 62C provided to the optical output with respect to the second Pockels cell 64B. As is shown in FIG. 9, an electrical signal E is supplied to each of the Pockels cells 64A and 64B from voltage signal generating members 100 which correspond to the first vacuum interrupting unit VI-1 and the second vacuum interrupting unit VI-2.

In accordance with the monitoring device shown in FIGS. 8 and 9, there are provided two electric field generating members 100 which correspond to the first and second vacuum interrupting units VI-1 and VI-2. The first electric field detecting member 60A detects the variation of the electric field in the first vacuum interrupting unit VI-1, and the second electric field detecting member 60B senses the change of the electric field in the second vacuum interrupting unit VI-2. Consequently, when at least one of the vacuum interrupters VI-1 and VI-2 attains an abnormal condition, namely, when the pressure of vacuum inside of the envelope 10 thereof increases, the Pockels cells detect the changes of the electric field of the units VI-1 and VI-2, and thereby the discriminating member 80 discriminates the loss of vacuum and generates the information signal. The mode of operation of the plural unit system is shown by a table 1.

TABLE 1

| Pressure of Vacuum | | Polarization | | Output of the |
|---|---|---|---|---|
| VI-1 | VI-2 | 64A | 64B | Discriminator |
| normal | normal | no | no | 0 |
| normal | abnormal | no | yes | 1 |
| abnormal | normal | yes | no | 1 |
| abnormal | abnormal | yes | yes | 1 |

In the table 1, "normal" means that the envelope 10 has the proper vacuum, and "abnormal" means that the pressure of vacuum in the envelope 10 is increased. Further, "no" means that the change of polarization is not carried out, and "yes" means that the change of polarization is performed. Finally, "0" indicates that no output signal is generated by the discriminating member 80, and "1" indicates that an output signal is produced by the discriminating member 80.

Figure 11:
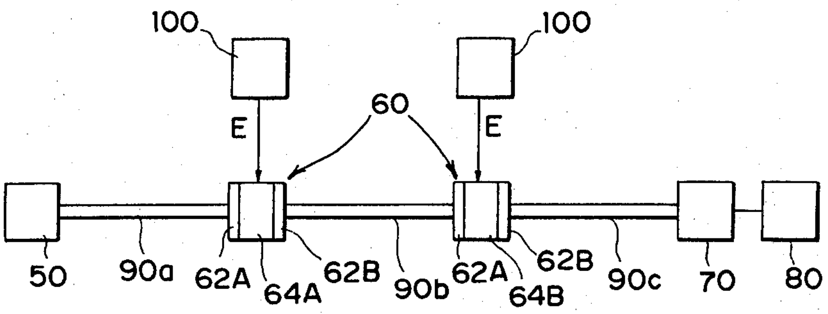
FIG. 11 is a block diagram showing a modification of the monitoring device of FIG. 8.
Figure 12:
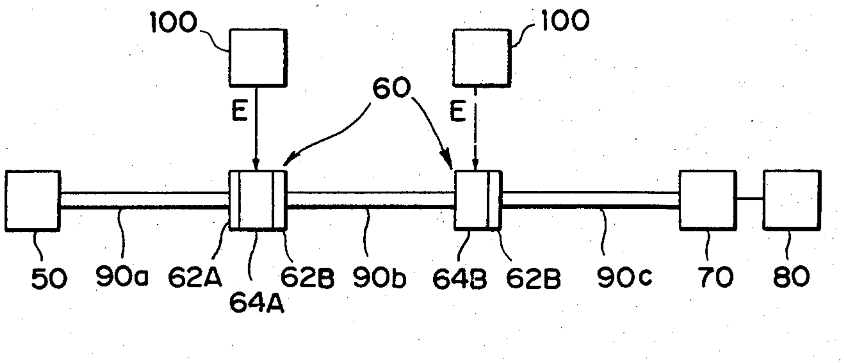
FIG. 12 is a block diagram showing an other modification of the monitoring device of FIG. 8.
Figure 13:
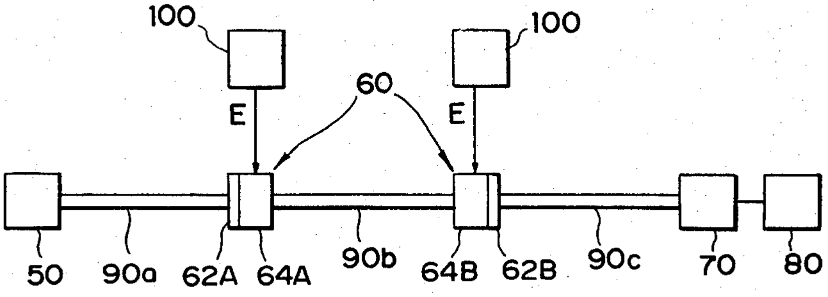
FIG. 13 is a block diagram showing a modification of the monitoring device of FIG. 12.

FIGS. 11 to 13 show modifications of the pressure responsive monitoring device of FIGS. 8 and 9. A pressure responsive monitoring device for vacuum circuit interrupters of FIG. 11 comprises a first and second electric field detecting members, each detecting member 60 including a first polarizer 62A, a first and second pockels cell 64A (64B) and a second polarizer 62B. A light source 50 connects to the first electric field detecting member 60 via means of an optical fiber 90*a*. The second electric field detecting member 60 comprising a second pockels cell 64B is connected by means of an optical fiber 90*b* to the first electric field detecting member 60 and to photoelectric converting member 70. Photoelectric converting member 70 is connected to the second electric field detecting member 60 by a third optical fiber 90*c*, and a discriminating member 80 is connected electrically to the converter 70. According to the device of FIG. 12, the first polarizer is omitted in the second electric field detecting member, and the device operates similarly to the device of FIG. 11.

FIG. 13 is illustrative of further modification of the device shown in FIGS. 8 and 9. In the pressure responsive monitoring device, a first electric field detecting member comprises a first polarizer 62A connected to a light source 50 and to a first pockels cell 64A provided on an output side of the first polarizer 62A, and a second electric field detecting member is comprised of a second pockels cell 64B connected to the first pockels cell 64A of the first electric field detecting member and to a second polarizer 62B provided on an output side of the second pockels cell 64B. In accordance with the device of FIG. 13, the same operation is performed and the same advantages are obtained as in the device of FIG. 12.

According to the pressure responsive monitoring devices for the vacuum circuit interrupters of FIGS. 8 to 13, the following effective advantages are obtained.

Since a plurality of vacuum interrupting units can be monitored by a single field detecting circuit loop, simplified and low cost monitoring systems are obtained and thereby automatic control of the power supply system can be easily performed.

Figure 14:
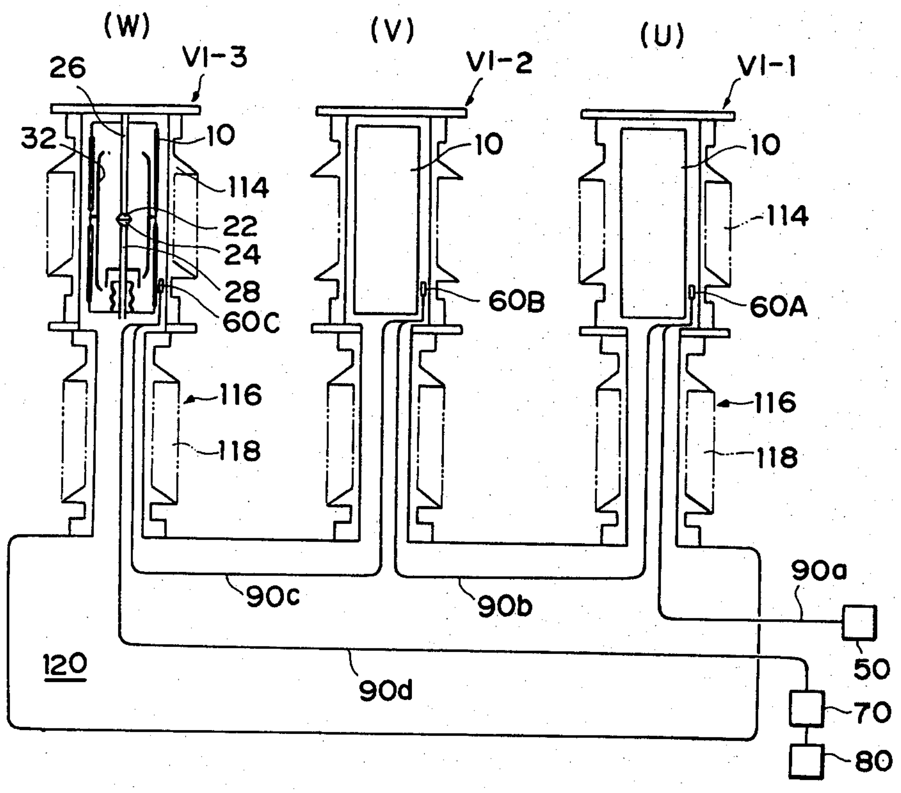
FIG. 14 is an elevational view showing a further embodiment of a pressure responsive monitoring device for vacuum circuit interrupters in accordance with the present invention.

FIG. 14 shows one possible embodiment of the pressure responsive monitoring device for vacuum circuit interrupters. In the device shown in FIG. 14, each of envelopes 10 of interrupting units VI-1, VI-2 and VI-3 is equipped with voltage dividing means which comprises voltage dividing capacitors 130, and each of electric field detecting members 60A, 60B and 60C is electrically and mechanically connected to the appropriate voltage dividing capacitor 130. The electric field detecting members 60A, 60B and 60C detect the change in terminal voltage depending upon the change of vacuum pressure inside of the envelopes 10.

Vacuum circuit interrupter of the type just described are generally employed in three phase power systems operating at relatively high voltages. Referring specifically to FIG. 14, there is shown a simplified three phase power system with a three phase load, employing the present invention. Vacuum interrupting units VI-1, VI-2 and VI-3 of the type just described are connected in series with each of the power lines.

Figure 15:
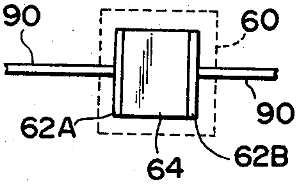
FIG. 15 is a plan view of an electric field detecting member employed in the monitoring device of FIG. 14.

The monitoring device of FIG. 14 comprises a light source 50, a first electric field detecting member 60A disposed in the first interrupting unit VI-1 and connected to the light source 50 by a first optical fiber 90*a*, a second electric field detecting member 60B which is provided in the second interrupting unit VI-2 and connected to the first electric field detecting member 60A by way of a second optical fiber 90*b*, and a third electric field detecting member 60C disposed in the third interrupting unit VI-3 and connected to the second detecting member 60B by a third optical fiber 90*c*. Additionally, a photoelectric converting member 70 is connected to the third detecting member 60C for optical fiber 90*d*, and a discriminating circuit 80 is provided which circuit is electrically connected to the photoelectric converting member 70. Each of electric field detecting members 60A, 60B and 60*c* is constructured as is shown in FIG. 15. Specifically, each detecting member includes a first polarizer 62A, a second polarizer 62B and a pockels cell 64 provided between the polarizers 62A and 62B, and is moulded of materials such as resin.

Figure 16:
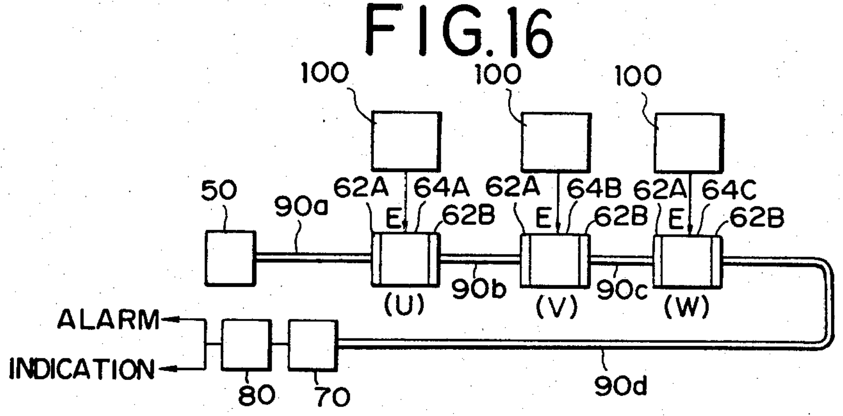
FIG. 16 is a block diagram of the monitoring device of FIG. 14.

FIG. 16 shows a detailed construction of the monitoring device of FIG. 14. In a three phase power line, it is assuming that the first detecting member corresponds to the U phase of the power supply lines, the second detecting member corresponds to the V phase, and the third detecting member corresponds to the W phase. According to the monitoring device shown in FIGS. 14 and 16, it is apparent that the logical operation of these devices can be performed as is shown in the table 2.

TABLE 2

| Pressure of Vacuum | | | Polarization | | | Output of the |
|---|---|---|---|---|---|---|
| U | V | W | U | V | W | Discriminator |
| 0 | 0 | 0 | 0 | 0 | 0 | 1 |
| 0 | 0 | 1 | 0 | 0 | 1 | 0 |
| 0 | 1 | 0 | 0 | 1 | 0 | 0 |
| 0 | 1 | 1 | 0 | 1 | 1 | 0 |
| 1 | 0 | 0 | 1 | 0 | 0 | 0 |
| 1 | 0 | 1 | 1 | 0 | 1 | 0 |
| 1 | 1 | 0 | 1 | 1 | 0 | 0 |
| 1 | 1 | 1 | 1 | 1 | 1 | 0 |

In the table 2, a logical "0" describing pressure of vacuum means that the vacuum pressure is normal, and a logical "1" shows that the pressure of vacuum is abnormal in regards to the vacuum circuit interrupter. With reference to a polarization, the logical "0" means that the change of polarization of light is not carried out, a logical =1" means that the changes of polarization of light is carried out and the polarization is performed. Further, in regards to the output of the discriminator, a logical "1" shows that the pressure of vacuum is normal, and a logical "0" means that the degree of vacuum is abnormal.

In the circuit shown, the indicating or logic signals are isolated from the high voltage portion by using light coupling. A leak in any vacuum circuit interrupter with which a monitoring device is associated provides an output logic or control signal. Also it is desirable to be able to employ this logic signal, together with other signals, to identify the specific vacuum circuit interrupter which has lost vacuum, sound an alarm, and provide instructions to an operator.

Figure 17:
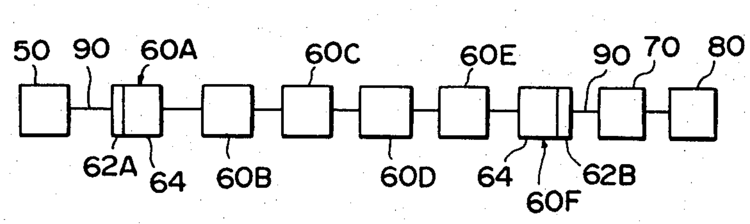
FIG. 17 is a block diagram of a modification of the monitoring device of FIG. 14.

As previously described, the vacuum circuit interrupters are generally employed in three phase power systems operating at high voltage. Particularly, when the voltage to be operated is extremely high, it is necessary to use a vacuum circuit interrupter in which circuit interrupters are series connected plurarity of vacuum tubes in each of the U, V and W phases. Referring specifically to FIG. 17, there is shown schematically a pressure responsive monitoring device having six electric field detecting members 60A, 60B, 60C, 60D, 60E and 60F. In the device shown, the same operation is performed as in the previously described monitoring devices, and same advantages are obtained.

While we have shown and described particular embodiments of the present invention, it will be obvious to those skilled in the art that various changes and modifications may be made without departing from the invention in its broader aspects, and we, therefore, intended in the appended claims to cover all such changes and modifications as fall within the true spirit and scope of the invention.

What is claimed is:

1. A pressure responsive monitoring device for a vacuum circuit interrupter having an evacuated envelope, comprising an electric field generating member for generating an electric field, a voltage detecting circuit loop which includes a light source for generating light, an electric field detecting member for detecting change of electric field in said electric field generating member depending upon the change of vacuum pressure of said envelope of the vacuum circuit interrupter, a photoelectric converting member for converting an output light signal from said electric field generating member to an electric signal, and a vacuum pressure discriminating member for discriminating vacuum pressure of said envelope of the vacuum circuit interrupter in response to the electric signal of said photoelectric converting member, said electric field detecting member comprising an electric field sensitive means for changing an angle of polarization of the light generated by said light source and an analyzing element for analyzing an output light generated by the electric field sensitive element.

2. A pressure responsive monitoring device for vacuum circuit interrupter as claimed in claim 1 wherein said electric field sensitive means of the electric field detecting member is provided spaced apart at a predetermined distance from a part of said envelope of the vacuum circuit interrupter for detecting the deviation of electric field in response to change of the degree of vacuum inside the envelope.

3. A pressure responsive monitoring device for vacuum circuit interrupters as claimed in claim 2 wherein the vacuum circuit interrupter of the electric field generating member further comprises a pair of separable contacts within said envelope adapted to be connected in series with the circuit to be interrupted, a metal shield surrounding the contacts and shielding the envelope against metal deposits, and a disc surrounding the metal shield connected to tubular structures forming a tubular flange for supporting said metal shield.

4. A pressure responsive monitoring device for vacuum circuit interrupters as claimed in claim 3 wherein said electric field sensitive means is provided spaced apart at a predetermined distance from said tubular flange.

5. A pressure responsive monitoring device for vaccum circuit interrupters as claimed in claim 1 wherein said electric field detecting member comprises a polarizing element for polarizing the light generated by said light source, said electric field sensitive means operable for changing a polarizing direction of light polarized by said polarizing element, said analyzing element operable for detecting a phase difference of an output light generated by said electric field detecting element.

6. A pressure responsive monitoring device for vacuum circuit interrupters as claimed in claim 1 wherein said electric field generating member comprises a vacuum interrupter, and said electric field detecting member is provided spaced apart at a predetermined distance from said envelope of the vacuum circuit interrupter.

7. A pressure responsive monitoring device for vacuum circuit interrupters as claimed in claim 6 wherein said vacuum circuit interrupter of the electric field generating member comprises a pair of contacts within said envelope adapted to be connected in series with the circuit to be interrupted, a metal shield surrounding the contacts and shielding the envelope against metal deposits, and a disc for supporting said metal shield.

8. A pressure responsive monitoring device for vacuum circuit interrupters as claimed in claim 1 wherein said electric field sensitive means comprises a pockels cell.

9. A pressure responsive monitoring device for vacuum circuit interrupters as claimed in claim 1 or 5 wherein said electric field detecting member is connected to said light source by an optical fiber.

10. A pressure responsive monitoring device for vacuum circuit interrupters as claimed in claim 1 or 5 wherein said electric field detecting member is connected to said photoelectric converting member by an optical fiber.

11. A pressure responsive monitoring device for a vacuum circuit interrupter as claimed in claim 1 wherein said vacuum circuit interrupter comprises a three phase vacuum interrupting unit having a plurality of vacuum interrupting units, and wherein said electric field detecting circuit loop includes electric field detecting members which are provided in said vacuum interrupting units.

12. A pressure responsive monitoring device for a vacuum circuit interrupter having an evacuated envelope, comprising an electric field generating member for generating an electric field, a detecting circuit loop which includes a light source for generating light, an electric field detecting member for detecting change of electric field in said electric field generating member depending upon the change of vacuum pressure of said envelope of the vacuum circuit interrupter, and a photoelectric converting member for converting an output light signal from said electric field generating member to an electric signal, said electric field detecting member comprising a polarizing element for polarizing the light generated by said light source, and an electric field detecting element for changing an angle of polarization of light polarized by said polarizing element.

13. A pressure responsive monitoring device for vacuum circuit interrupters as claimed in claim 12 wherein said polarizing element is connected to the light source by an optical fiber, and said electric field detecting member comprises a pockels cell provided in the output side of the polarizer.

14. A pressure responsive monitoring device for vacuum circuit interrupters as claimed in claim 13 wherein said photoelectric converting member is connected to said analyzing element by an optical fiber.

15. A pressure responsive monitoring device for a vacuum circuit interrupter having an evacuated envelope, comprising an electric field generating member for generating an electric field, and including a vacuum circuit interrupter, a detecting circuit loop which includes a light source for generating light, an electric field detecting member for detecting change of electric field in said electric field generating member depending upon the change of vacuum pressure of said envelope of the vacuum circuit interrupter, and a photoelectric converting member for converting an output light signal from said electric field generating member to an electric signal, the vacuum circuit interrupter of said electric field generating member having a plurality of series connected vacuum interrupting units in one phase of a power supply line.

16. A pressure responsive monitoring device for a vacuum circuit interrupters as claimed in claim 5 comprising an electric field detecting circuit loop which includes said light source for generating light, a first electric field detecting member connected to said light source by a first optical fiber and provided in a first vacuum interrupting unit, a second electric field detecting member connected to said first electric field detecting member by a second optical fiber and provided in a second vacuum interrupting unit, a photoelectric converting member connected to said second field detecting member by a third optical fiber, and a vacuum strength discriminating member electrically connected to said photoelectric converting member.

17. A pressure responsive monitoring device for vacuum circuit interrupters as claimed in claim 16 wherein said first electric field detecting member cmprises a first polarizer connected to the light source, a first pockels cell provided at an output side of said first polarizer, and a first analyzer provided at an output side of said first pockels cell, and wherein said second electric field detecting member comprises a second pockels cell connected to said first analyzer of the first electric field detecting member, and a second analyzer provided in an output side of said second pockels cell.

18. A pressure responsive monitoring device for vacuum circuit interrupters as claimed in claim 16 wherein each of said first and second electric field detecting members comprises a polarizer connected to the light source, a pockels cell provided at an output side of said polarizer, and an analyzer provided in an optical output side of said pockels cell.

19. A pressure responsive monitoring device for circuit interrupters as claimed in claim 16 wherein said first electric field detecting member comprises a first polarizer connected to the light source, a first pockels cell provided at an optical output side of said polarizer, and a second polarizer provided at an optical output side of said first pockels cell, and wherein said second electric field detecting member comprises a second pockels cell optically connected to said second polarizer of the first electric field detecting member, and a second polarizer provided at an optical output side of said second pockels cell.

20. A pressure responsive monitoring device for vacuum circuit interrupters as claimed in claim 16 wherein said first electric field detecting member comprises a polarizer connected to the light source, and a first pockels cell provided at an optical output side of said polarizer, and wherein said second electric field detecting member comprises a second pockels cell optically connected to said first pockels cell of the first electric field detecting member, and a second polarizer provided at an optical output side of said second pockels cell.

21. A pressure responsive monitoring device for vacuum circuit interrupters as claimed in claim 15 comprising a first electric field detecting member connected to said light source by a first optical fiber and provided in a first vacuum interrupting unit, a second electric field detecting member connected to said first electric field detecting member by a second optical fiber and provided in a second vacuum interrupting unit, a photoelectric converting member connecting to said second field detecting member by a third optical fiber, and a vacuum strength discriminating member electrically connected to said photoelectric converting member.

22. A pressure responsive monitoring device for vacuum circuit interrupters as claimed in claim 21 wherein said first electric field detecting member comprises a polarizer connected to the light source, and a first pockels cell provided at an optical output side of said polarizer, and wherein said second electric field detecting member comprises a second pockels cell and an analyzer provided at an optical output side of said second pockels cell.

23. A pressure responsive monitoring device for a vacuum circuit interrupter having an evacuated envelope, comprising an electric field generating member for generating an electric field, and including a vacuum circuit interrupter, a detecting circuit loop which includes a light source for generating light, an electric field detecting member for detecting change of electric field in said electric field generating member depending upon the change of vacuum pressure of said envelope of the vacuum circuit interrupter, and a photoelectric converting member for converting an output light signal from said electric field generating member to an electric signal, said vacuum circuit interrupter comprising a three phase vacuum interrupting unit having a plurality of vacuum interrupting units;

said detecting circuit loop including electric field detecting elements which are provided in said vacuum interrupting units.

24. A pressure responsive monitoring device for vacuum circuit interrupters as claimed in claim 23 including a plurality of vacuum circuit interrupters wherein each of said vacuum circuit interrupters includes two vacuum interrupting units connected in series in one phase of a power line, and each of said vacuum interrupting units is equipped with an electric field detecting member of the detecting circuit loop.

25. A pressure responsive monitoring device for vacuum circuit interrupters as claimed in claim 24 wherein said electric detecting circuit loop comprises, a plurality of electric field detecting members provided in a series connection in each of said vacuum interrupting units, a photoelectric converting member for converting an optical signal supplied from said electric field detecting members, and a vacuum strength discriminating member electrically connected to said photoelectric converting member, one of said electric field detecting members being connected to said light source and comprising an electric field detecting member consisting of a polarizer optically connected to said light source and a pockels cell, and an electric field detecting member consisting of a pockels cell connected to an adjacent electric field detecting member, and a polarizer connected to said photoelectric converting member.

26. A pressure responsive monitoring device for vacuum circuit interrupters as claimed in claim 23 wherein said electric field detecting circuit loop comprises a light source, a plurality of electric field detecting members provided in a series connection in each of said vacuum interrupting units, a photoelectric converting member for converting an optical signal supplied from said electric field detecting members, and a vacuum strength discriminating member electrically connected to said photoelectric converting member, one of said electric field detecting members being connected to said light source and comprising an electric field detecting member consisting of a polarizer optically connected to said light source and a pockels cell, and an electric field detecting member consisting of a pockels cell connected to an adjacent electric field detecting member, and a polarizer connected to said photoelectric converting member.

27. A pressure responsive monitoring device for a vacuum circuit interrupter having an evacuated envelope, comprising:

electric field generating means for generating an electric field responsive to vacuum pressure in said envelope, a light source for generating light, electric field detecting means for detecting changes in said electric field indicative of pressure changes in said envelope, and producing an output signal representing said pressure changes, photoelectric converting means for detecting light generated by said light source and outputting an electric signal, electrically operable light intensity control means arranged for varying intensity of detected light incident on said photoelectric detecting means responsive to said electric field detecting means output signal, and indicating means responsive to said photoelectric output electric signal for providing an indication of pressure changes in said envelope.

* * * * *